United States Patent [19]

Weigel et al.

[11] 4,223,876
[45] Sep. 23, 1980

[54] APPARATUS FOR DIRECT RECOVERY OF METAL FROM METAL-BEARING ORES

[75] Inventors: Horst Weigel; Karl Müller, both of Cologne, Fed. Rep. of Germany

[73] Assignee: Klöckner-Humboldt-Wedag AG, Fed. Rep. of Germany

[21] Appl. No.: 15,461

[22] Filed: Feb. 26, 1979

Related U.S. Application Data

[62] Division of Ser. No. 858,391, Dec. 7, 1977, Pat. No. 4,179,284.

[30] Foreign Application Priority Data

Dec. 9, 1976 [DE] Fed. Rep. of Germany ....... 2655813

[51] Int. Cl.³ .............................................. F27B 15/00
[52] U.S. Cl. .................... 266/156; 266/166; 266/176; 266/186
[58] Field of Search ............... 266/156, 186, 176, 166; 75/35, 38, 33, 34

[56] References Cited

U.S. PATENT DOCUMENTS

| | | | |
|---|---|---|---|
| 2,973,260 | 2/1961 | Nogiwa | 75/40 |
| 3,725,043 | 4/1973 | Kawai et al. | 75/35 |
| 3,936,296 | 2/1976 | Campbell | 75/34 |
| 4,045,214 | 8/1977 | Wetzel et al. | 75/38 |

*Primary Examiner*—M. J. Andrews
*Attorney, Agent, or Firm*—Hill, Van Santen, Steadman, Chiara & Simpson

[57] ABSTRACT

Iron, for example is directly recovered from relatively fine-grained (having a grain particle size range of less than 250 microns), iron-bearing ore whereby carbon-containing materials and oxygen-containing materials are fed through a molten metal bath and converted into a CO/H₂-rich reduction gas which is sequentially passed upwardly at gas speeds of at least 1.5 m/sec. through downwardly moving ore particles within a reduction apparatus comprised of a sequence of interconnected cyclones so that ore particles in each cyclone are in a state of suspension and in intimate contact with the reduction gas and each other whereby extensive reduction of the ore particles occurs at each cyclone so that after a last cyclone the so-reduced ore particles are directly fed into a smelting means, from which liquid iron is recovered.

9 Claims, 1 Drawing Figure

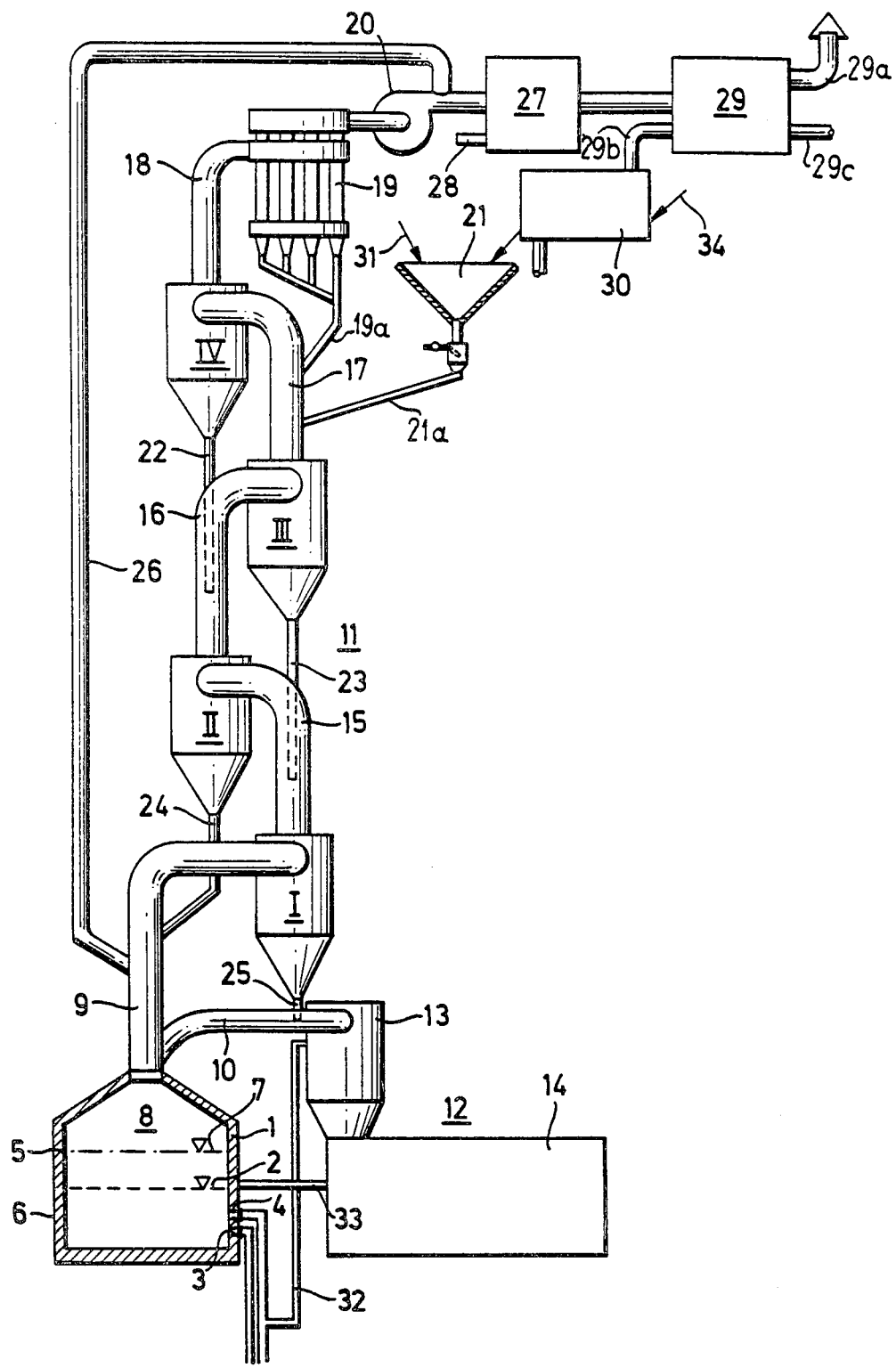

APPARATUS FOR DIRECT RECOVERY OF METAL FROM METAL-BEARING ORES

This is a division of application Ser. No. 858,391, filed Dec. 7, 1977 now U.S. Pat. No. 4,179,284.

BACKGROUND OF THE INVENTION

1. Field of the Invention

The invention relates to metal recovery from iron-bearing ores and somewhat more particularly to a method and apparatus for direct recovery of metal from relatively fine-grained metal-bearing ores and/or concentrates thereof wherein carbon and/or hydrocarbon-containing materials are utilized as the initial reduction materials.

2. Prior Art

The classical recovery of metal, such as iron-steel, in a metal recovery furnace system, such as a blast furnace-steel furnace system requires extensive preparation of metal-bearing ores and/or fine-grained metal-bearing ore concentrates, along with the refining of coal into high-grade metallurgically stable coke.

Lump ores, such as were conventionally utilized as starting materials during the time when the blast furnace technology began, are only today available on a small scale and less than about 50% of this type of material is now being directly utilized. Today, more than about 85% of the first refinements of a metal-bearing ore for metal, such as iron recovery are with fine-grained ore concentrates. However, typical blast furnaces can only be operated with lumpy starting materials and very special properties are required of such starting materials, particularly in regard to their physical structure. For this reason, typical metal ore concentrates, such as iron ore concentrates must first be subjected to a thermal sintering process or to a two-stage mechanical-thermal solidification process.

The fossil reduction medium typically utilized to reduce metal-bearing ores, coal, must be converted, via a separate process in a coke-oven means, into a coke material which has sufficient stability for conditions encountered within a blast furnace. Only special types of coal can be utilized to produce such coke and this coal is available only in everdecreasing quantities.

Accordingly, the art has undertaken numerous attempts to develop methods of metal recovery which are less costly in regard to the preparation of starting materials and which are more compatible with the type of raw materials available today.

One such attempt comprises combining known processes and has become known as the "direct reduction process." In these processes, a series of methods have been proposed wherein coke is no longer utilized for reduction, but instead, a reducing gas is utilized as the reduction agent and/or wherein fine ore particles are no longer sintered with coke dust but are instead utilized in the form of pellets, which are less costly to manufacture. Suitable shaft furnaces and retort means have been developed for use as reduction housings with such processes.

The prior art endeavors to advance a further step and reduce fine-grained metal-bearing ores directly with a gas have led to a plurality of diverse methods, in which ore particles and a gas are brought into contact to react with one another in a suspended state; which, if achievable, would produce a considerable technological and economic advancement. However, attempts to bring these methods into operation maturity has not heretofore been successful. The reason for this appears to lie in the fact that it has not been possible to combine the various diverse technologies in such a meaningful manner that the deficiencies and limits of the various independent steps, which are known per se, can be adequately eliminated.

For example, in regard to the reduction step, a substantial art concentration has occurred on the technological processes utilizing such variants as turbulence layers, airborne dust clouds and/or jet smelting in a direct current system; all of which require a very narrow range of gas-to-solid ratios in order to maintain a stabile system (for example, see Bogdandy and Engell, "The Reduction of Iron Ore" (1967), pages 209–243, published by Stahleisen mgH/Dusseldorf, Germany).

Reduction processes involving the so-called airborne dust cloud as well as those involving the so-called turbulence layers utilize, as a common typical characteristic feature, comparatively low relative speeds between ore particles and reducing gas so that considerable amounts of gas are necessary to attain the heat requirements of the reduction reaction and for ore heating.

In producing an airborne dust cloud, gas speeds are selected which are exactly sufficient to maintain extremely fine ore particles in gas suspension relative to the specific weight of such particles and the falling speed resulting therefrom. Accordingly, gas speeds are regulated so as to be, as a rule, below about 1 m/sec. and in exceptional cases, where the average particle size is over about 0.1 mm, gas speeds above about 1 m/sec. are possible.

In the turbulent layer methods, gas speeds are utilized which are on the same order of magnitude as set forth above. With these methods, it is possible to work with comparatively large particle sizes. In instances where the average particle size is over about 1 mm, the upper limit of the gas speed is on the order of magnitude of about 1.5 m/sec.

In contrast, with the so-called "jet-smelting" process, the direct-current principle has been utilized whereby the influx gas speed and the particle falling speed are actually adapted to one another so that almost no relative speed between the solids and the gas exists.

Reduction of fine size ore particles occurs extraordinarily fast via a heated gas so that the reduction equilibrium of a reducing gas at a specified reaction temperature must be considered. After an extremely short contact period between ore particles and a reduction gas, gas molecules are absorbed onto the immediate or outer surface of an ore particle so that the reduction gas is unable to cause further reduction on such particle. Accordingly, with the aforesaid prior art methods, it is apparent that because of the limiting low gas flow speeds over long periods, extremely large amounts of reducing gas must be provided to the ore particles in order to attain at least a somewhat satisfactory degree of reduction. Naturally, this results in an extremely unsatisfactory utilization of the reduction gas, and is characterized by a high ratio of gaseous to solid materials, which as a rule amounts to more than 2 to 3 times the stoichiometrically required amount of gas. Thus, for example, the J. Iron Steel Inst., Vol. 194 (1960), pages 211–221, indicates that the time required for a 80% reduction of fine-grained ore particles of varying origin pulverized into very small particles (50 to 150 microns) and in a state of suspension within a hydrogen stream and heated to a temperature in the range of 700° to 1100° C., is between 20 to 30 seconds; indeed, almost independent of the type of ore and/or particle size thereof.

Further, it is known that a high degree of chemical utilization of a reduction gas can be attained if the reduction reaction is conducted at as high a temperature as possible. However, experiments have shown that fine-grained ore-mixtures reduced at temperatures above 900° C. undergo, depending on the degree of reduction, a more or less surface-softening reaction so that the use of higher reduction temperatures is not practical. To the contrary, in the known direct reduction processes, suggestions are always made to the effect that the reduction temperature must be kept below this limit, i.e., below a temperature at which the particles undergo a melt-phase formation. However, the chemical and thermal dynamic laws (equilibrium ratio), with a given reduction temperature below 900° C., dictate a comparatively low material conversion, even when a complete utilization of a reduction gas occurs. Accordingly, this condition, in itself, is an even more compelling reason for conveying particularly large quantities of a reduction gas over very extended periods of time past the ore particles in order to repeatedly disrupt the dynamic thermal equilibrium about each particle and effect a good reduction and, in this manner, produce favorable conditions for further reduction. However, this can only be achieved with the above-process techniques if long dwell periods are acceptable, which necessarily cause low material outputs.

In order to produce somewhat more favorable conditions in this regard, certain prior art has suggested reducing fine-grained iron ore in a dry state within a cyclone heat-exchange system via a reducing gas. This process seeks to produce finely-grained iron powder. However, taken by itself, this has a decisive shortcoming in that, given the necessary temperature, there is a very great danger of a reoxidation of the ore (which has already been reduced) occurring on impact with air. To avoid this danger, it has been suggested that this effect can be countered by the addition of coal in the individual cyclone stages. Iron powder produced in this fashion, sometimes referred to as iron sponge, must be hardened or stabilized with a protective gas and then conveyed for further processing. Further, the presence of solid carbon in iron sponge necessarily results in a poor utilization of the reducing agent.

Production of reducing gas for use in iron ore processing, outside the blast furnace technique, is known and a majority of such processes heretofore utilized a starting material comprised of natural gas which was converted into a $CO/H_2$-rich reduction gas via a cracking procedure. However, there are also known processes for producing a reduction gas directly from coal. Such processes take place in so-called gas generators, of which only the high temperature-smelting generators directly supply a gas suitable for reduction purposes and without appreciable amounts of hydrocarbons therein. However, such gas is not free of $CO_2$, the presence of which is not desirable in a reduction gas.

Recently, a gasification process has been developed wherein coal is blown into a molten iron bath and is thereby converted into a reduction gas which is free of hydrocarbons and $CO_2$. In this process, coal is conveyed in a fine particle form into a molten iron bath via a water-cooled sparger-like device and simultaneously oxygen is introduced into the molten iron bath via a second sparger-like device. Lime is added to such iron bath in order to produce an alkaline slag on such bath so that any sulfur present in coal is absorbed by the alkaline slag. With this method, cheap and impure coal can be successfully converted into a useful reduction gas having a high $CO/H_2$ concentration. Further, such reduction gas is typically produced at a temperature of about 1400° C., which is sufficiently high for reduction processes.

However, a problem exists in incorporating the aforesaid conversion of coal into a reduction gas via a metal bath with an metal-ore recovery process so as to achieve a technologically useful, problem-free and economical process which overcomes the performance or product limits of presently known reduction systems.

SUMMARY OF THE INVENTION

The invention provides a method and apparatus for direct metal recovery from available metal-bearing ores (or concentrates thereof) whereby finely granulated ore particles are directly reduced without an agglomeration into pellets or the like and without a preparation, in a dry state, of metal sponge and whereby liquid metal is produced directly from the so-reduced material.

In accordance with the principles of the invention, carbon and/or carbon-containing materials and oxygen and/or oxygen-containing materials are converted within a molten metal bath into a hot $CO/H_2$ reduction gas, which is then brought, at a gas speed of at least 1.5 m/sec., into intimate contact with finely-grained metal-bearing ore particles, which preferably have a particle size of less than 250 microns, and conveying such gas-ore particle mixture through several reduction stages at relatively high and alternating relative speeds between the gas and the ore particles so that such ore particles are reduced to such a great extent that the so-reduced ores are, thereafter, directly introduced into a smelting reactor from which liquid iron is removed as a valuable product.

The invention thus provides a continuously operating system for direct recovery of metal such as iron in accordance with the suspension gas-reduction principles and which provides a high degree of reduction gas utilization and substantially meets the capacity of present-day demands of large metal working systems.

BRIEF DESCRIPTION OF THE DRAWING

The FIGURE is a somewhat schematic illustration of an embodiment of a system for direct recovery of metal constructed and operating in accordance with the principles of the invention.

DESCRIPTION OF THE PREFERRED EMBODIMENTS

The invention provides a method and apparatus for direct recovery of metal, such as iron from a metal bearing ore, such iron-bearing ores, whereby a $CO/H_2$-rich reduction gas is generated in situ and successively passed at a relatively high speed through a multi-stage reduction system, such as a plurality of cyclone stages, so as to intimately contact, at each stage, ore particles and reduce at least a portion of such particles at each stage before passing to a next stage in a countercurrent fashion while the particles simultaneously pass to a different stage. In this manner, alternating relatively high speeds between the ore particles and the gas stream are maintained so that the reduction equilibrium conditions about each particle within a given stage are periodically disrupted and increased overall reduction occurs. After the final ore particle reduction stage, the particles are sufficiently reduced for direct passage into a smelting reactor from which liquid metal, such as iron may be removed as a valuable product. As the reduction gas passes through the various stages, it is somewhat cooled and after a last gas-utilization stage, a portion of such cooled reduction gas may be recycled to a hotter or first gas utilization stage so as to maintain a required temperature throughout the reduction system.

In accordance with the principles of the invention, it is possible to produce a virtually $CO_2$-free reduction gas having a very high $CO/H_2$ concentration (typically over about 80% by volume) and, by virtue of the multi-stage reduction reaction, in comparison with the heretofore known direct-reduction systems, a minimal gas quantity (in relation to the solid material being processed) can be conveyed at a relatively high and chronologically changing speed to the surface of the ore particles. This is of decisive significance in terms of a high degree of ore reduction because it is the discharge of the gas reaction by-products, $CO_2$ and $H_2O$, which defines the speed-determining step of ore reduction and not the extremely rapid reaction between the reducing gas molecules and the particle surfaces, which is a phase-limited reaction. Thus, in accordance with the principles of the invention, the reaction equilibrium for a specific temperature at a given time within the overall system is constantly disrupted so that further reduction reactions can take place. In this manner, the degree of reduction is decisively improved and by optimizing on the principles of the invention, a reduction degree of about 100% can be achieved. At the same time, the principles of the invention allow a maximum reduction gas utilization, which is approximately the stoichiometric amount of gas required for a given amount of ore.

By utilizing a multi-stage reduction system (method and apparatus) which provides a relatively high and, in addition a variable relative speed, between the ore particles and the reduction gas at each stage, the invention provides short contact times between the ore particles and the reduction gas, while simultaneously provides a maximum reduction gas utilization and a very high degree of ore reduction. Further, this feature of the invention is of particular significance when large relative speeds, for example, 30 m/sec., are established between the ore particles and the gas since then localized hot spots or the like during the reduction reaction, where the ore temperature may exceed the critical temperature of 900° C., can be tolerated without causing undesirable sintering of the partially reduced ore particles with one another or with the walls of the apparatus, a disadvantageous result which begins to occur in heretofore available suspension gas systems at temperatures even below 850° C.

Ore particles which have been substantially reduced to metallic ores, as a consequence of their very fine granulated nature and large porous surface, indeed are inclined to a very rapid reoxidation. However, reoxidation is completely avoided with the invention since the reduction gas utilized for the suspension gas-reduction reaction is virtually free of $H_2O$ and $CO_2$ when such gas contacts ore particles reduced to the furthest degree (i.e., to metallic ores).

Another feature of the invention is that the metal powder produced in this manner, which is sometimes referred to as metal sponge, is suitable for direct melting into liquid metal in a smelting reactor under reduction conditions. Yet another economic feature of the invention is the continuous controls which are available throughout the system and adjustable over wide ranges in accordance with the respective demands of the quantity of the ore to be reduced, the quantity of the reduction gas produced in the molten bath and the nature of the smelting reactor utilized.

In one embodiment of the invention, the total amount of reduction gas generated from a metal bath reactor is introduced into the smelting reactor and subsequently passed through a multi-stage reduction system. In this manner, the high heat content of a so-generated reduction gas, which on emergence from a metal bath has a temperature of about 1400° C., can be directly and economically utilized to melt, under reduction conditions, the previously reduced ore from the reduction system while the reduction gas removed from such smelting reactor is at about the required temperature for dry reduction, although, if necessary, such gas may be slightly further cooled.

In another embodiment of the invention, a select amount of the generated hot reduction gas is conveyed to the reduction system and another select amount of such gas, along with an appropriate amount of oxygen and/or oxygen-containing materials are conveyed to the smelting stage. In this manner, only that particular amount of hot reduction gas is conveyed to the smelting stage which, after a corresponding oxidation with air-oxygen, is necessary for melting of the reduced metal-ore particles whereas the other select amount of the $CO/H_2$-rich reduction gas (which may, if desired, be admixed with a cooling medium), can be directly introduced into the multi-stage reduction system. It is expedient in this embodiment to oxidize the reduction gas fed into the smelting stage with air-oxygen in a stoichiometrically deficient amount so that reduction conditions prevail during the melting operation.

In another embodiment of the invention, the reduction gas passed through the multi-stage reduction system is freed of dust and at least partially, and preferably, conveyed back or recycled to the hottest stage of the reduction system. Preferably, the amount of recycled reduction gas is about 10 to 20% of the amount of reduction gas introduced into the reduction system. With this embodiment, the gas which emanates from the metal bath at a temperature of about 1400° C., is adjusted, depending on the quantity of the ore being processed, to an average gas inlet temperature at the reduction system of about 1100° to 1300° C. and after a heat-exchange between the partially reduced ore particles and such reduction gas, a mean or average reduction temperature is maintained on the order of about 900° C. so that melt phase formation and/or agglomeration of the fine-grained ore particles is permanently avoided.

When the temperature of the upper stages of the reduction system decreases, a formation of $CO_2$ occurs, along with carbon deposition whereby such carbon accumulates or is deposited on the ore particles at such upper stages. Such carbon-containing ore particles (i.e., carbon deposited by a $CO_2$-containing reduction gas at the colder upper stages, via the so-called Boudouard reaction), then travel to the lower hotter stages of the reduction system where this carbon is again converted to CO through the reduction capability of the reducing gas encountered at such lower stages of the reduction systems. Through this return cooling process, the partial pressure of the reducing gases, CO and $H_2$, in contrast with systems utilizing an inert cooling gas, such as N₂, is not reduced and the reduction rate is not negatively effected.

In a preferred embodiment of the invention, the fine-grained ore particles, prior to entrance into the smelting reactor, are charged or admixed with additional materials suitable for slag formation. In this manner, a smelting cyclone can be utilized as a smelting reactor. It is practical, when using a smelting reactor consisting of a cyclone furnace and a collective furnace, to only draw off so much exhaust gas from the cyclone furnace to the collective furnace that reduction conditions prevail in the latter. In this manner, the danger of reoxidation of melted-down ore in the collective furnace is avoided.

The apparatus embodiments of the invention comprise a metal bath reactor means having at least one nozzle for feeding a supply of carbon and/or carbon-containing materials and a supply of oxygen and/or oxygen-containing materials below a bath surface of a metal bath within such reactor means (the nozzles are preferably located on a wall region of such reactor which is provided with a fireproof lining or shield), and a gas exhaust port spaced above the bath surface. A reduction apparatus operating in multi-stages having a gas inlet port is connected with the gas exhaust port of the metal bath reactor means and is provided with a product-removal port spaced from such gas inlet port and connected with a smelting reactor. Preferably, the reduction apparatus comprises a suspension-gas-heat-exchange means consisting of a plurality of superimposed cyclones connected at a lower gas inlet port with the gas exhaust port of the metal bath reactor means and includes a product-removal port spaced from the lower gas inlet port. A smelting reactor is connected with such product-removal port and, in certain embodiments, with the gas inlet port.

The principles of the invention provide a compact and continuously operating system for direct recovery of metal, such as iron from fine-grained metal-bearing ores or their concentrates, which together with an economical utilization of a reduction gas (which is highly enriched with CO/H₂ and generated in situ via a metal bath reactor means), provides an optimum reduction of the fine-grained ore particles in a suspension gas-reduction system whereby a high degree of reduction of the ores and avoidance of any reoxidation permits a direct subsequent melting-down of such ores in a smelting reactor. With this compact system, the regulatory-technical and systems-technical outlay is substantially reduced in comparison with heretofore known suspension gas-reduction systems and, for the first time, a continuously operating large-scale system is available which permits an economical production of liquid metal as a valuable product directly from fine-grained iron-bearing ores.

A further apparatus embodiment of the invention comprises a system having a combustion chamber in communication with the gas exhaust conduit of the suspension gas-heat-exchange means. The combustion chamber is connected, at its hot gas-end with a hot-air generator which has a hot-air conduit in communication with an ore preheating means. In this system, the CO₂-containing exhaust gases which are drawn off from the suspension gas-heat-exchange means are, after taking advantage of the reduction potential, thermally used and the preceptible heat in such exhaust gas is utilized to preheat the fine-grained metal ore before such ore is loaded or charged into the suspension gas-heat-exchange means. In another apparatus embodiment of the invention where the smelting reactor consists of a cyclone furnace and a collective furnace, the collective furnace is interconnected with the metal bath reactor means at a location level with the bath surface within such reactor means via a discharge conduit for withdrawing any excess metal (iron) from the molten metal bath. This system provides a precise adjustment of the volume of molten metal within the molten metal bath reactor means.

Referring now to the exemplary embodiment illustrated in the drawing, a molten bath reactor means 1 is provided with a first nozzle 3 located below the surface 2 of a molten metal bath within the reactor means 1 for passage of a fine-grained coal or other carbon-containing material from a supply thereof (not shown), along with a second nozzle 4 adjacent to the first nozzle for passage of oxygen or an oxygen-containing material from a supply thereof (not shown). The nozzles are preferably located on a wall region 6 of the reactor means 1 which is lined or shielded with a fireproof material 5. A layer 7 of a sulfur-absorbing slag is provided above the bath surface 2 of the molten iron within the reactor means 1. A collection chamber 8 is located within the reactor means above the slag layer 7 for collecting the reduction gas produced.

The collection chamber 8 of the metal bath reactor means 1 is in communication with a main gas discharge conduit 9, which is in communication with a suspension gas-heat-exchange means 11. In the embodiment illustrated, the suspension gas-heat-exchange means 11 consists of four superimposed cyclone means I-IV. The main gas discharge conduit 9 is also connected to a branch conduit 10 which is in communication with a smelting reactor means 12. The smelting reactor means 12 may, for example, consist of a smelting cyclone 13 and a collection furnace 14, such as an electro-furnace. The individual cyclone means I through IV, comprising the suspension gas-heat-exchange means, are also interconnected with one another via gas conduits 15, 16 and 17 so that the reduction gas from the metal bath reactor means 1 flows from below sequentially upwardly through cyclone means I to cyclone means IV. Gas flow control means may be provided, if desired, within the various gas passageways so as to maintain a gas speed of at least 1.5 m/sec. and preferably about 3 to 30 m/sec.

From the uppermost cyclone means IV, the reduction gas is guided, via an exhaust gas conduit 18, into a dust-removing apparatus 19. The dust-removing apparatus 19 is provided with a lower material discharge conduit 19a which is connected with gas conduit 17 so that any dust or the like removed, as by washing from the spent reduction gas can be recycled into the suspension gas-heat-exchange means 11. A suction-draft blower or pump means 20 is connected at an upper discharge end of the dust-removing apparatus 19 for removing the spent gas from the system.

A pre-heating device 30 is controllably supplied with fine-grained metal-bearing ore particles 34 and/or concentrates thereof from a suitable source (not shown). The ore particles are thus controllably pre-heated and then controllably fed into a cone-like bin 21, along with suitable slag-forming material 31. A mixture of such ore particles and slag-forming materials are then controllably fed, via conduit 21a, into gas conduit 17 located between cyclones IV and III. The solid material discharges ends of each cyclone are connected via discharge conduits 22, 23 and 24 with the respective gas-conveying conduits 16, 15 and 9 while the solids discharge conduit 25 of the lowermost cyclone I is connected with the branch conduit 10 leading to the smelting reactor means 12. If desired, further slag-forming material may be added to the material within conduit 25.

A return-gas conduit 26 is provided on the downstream side of pump means 20 and is interconnected with the main gas discharge conduit 9, which leads hot reduction gases from the metal bath reactor means 1 into the hottest cyclone means I of the suspension gas-heat-exchange means 11.

The main outlet of pump means 20 is connected to a combustion chamber 27, which may be provided with a controllable oxygen inlet 28. The outlet or hot-gas side of the combustion chamber 27 is connected with a hot-air generator 29. The hot-air generator 29 has one outlet 29a communicating with ambient atmosphere and another outlet 29b communicating with the pre-heating device 30, which contains ore particles to be processed. The preheating device 30 is only shown diagrammatically and may be of any desired construction, for example, it may comprise a heat-exchanger operating directly or indirectly.

The collective furnace 14 of the smelting reactor 12 may be provided with a suitable conduit 33 to allow any excess molten metal from the reactor means 1 to flow into the collective furnace 14. Cyclone furnace means 13 of the smelting reactor 12 may be provided with a controllable oxygen inlet conduit 32.

An exemplary system for direct recovery of iron from fine-grained iron-bearing ore operates as follows:

A molten iron bath is generated within reactor means 1, along with a slag layer and a stoichiometric amount required for combustion of, for example, fine-grained coal and oxygen are blown into the iron bath reactor means 1 via nozzles 3 and 4. A reaction occurs within the iron melt, along with a large positive heat balance, converting the fine-grained coal and oxygen (or other mixture of carbon-containing material and oxygen-containing material) into a reduction gas, which consists essentially of only CO and $H_2$. Typically, no $CO_2$ and/or $H_2O$ are generated and any sulfur constituents present within the coal are absorbed in the slag layer. Of course, the slag layer may be purified of contaminant materials therein through a regeneration means (not shown). The CO/$H_2$-rich reduction gas so-generated is collected within the collection chamber 8 and then controllably introduced at a select speed into the main gas discharge conduit 9. the reduction gas travels through conduit 9 into the lowermost cyclone means I and then sequentially through the other superimposed cyclone means II–IV of the suspension gas-heat-exchange means 11. A select amount of the so-generated reduction gas is drawn off at the inlet of conduit 9, at which point it has a temperature of about 1400° C., into branch conduit 10 and from there guided into the smelting cyclone furnace means 13 of smelting reactor 12.

The hot reduction gas flows sequentially through the cyclone means via the interconnecting gas conduits 15, 16 and 17 and is drawn off from the suspension gas-heat-exchange means 11 by the pump means 20, after passing through the dust-removing device 19.

The fine-grained ore particles to be reduced, which may be pre-heated in the pre-heating device 30, and the slag-forming materials are controllably fed into the cone-like bin 21 and then controllably charged into the gas conduit 17, which guides this mixture of materials into the uppermost cyclone means IV of the suspension gas-heat-exchange means. In this manner, the ore particles and slag-forming materials are brought into intimate contact with the hot reduction gas. The reduction gas penetrates a gas layer around the crystal surface of the actual ore particle (typically oxides) and penetrates into the pores thereof because of the relatively high and alternating speed between such particles and the gas. A reduction reaction occurs between the gas molecules and the crystal surface, which is a phase-limitation reaction, during which gaseous reaction by-products are diffused outwardly from the actual small grain surfaces of the ore particles and from the pores therein. The high relative speed with which the CO/$H_2$-rich reduction gas flows past the ore particles ensures that a rapid removal of such gaseous by-product occurs and that the reaction equilibrium characteristic for the specific temperature of a particle at this point in time is disrupted so that further reduction reactions can occur and a higher degree of ore reduction is attained, as compared to prior art suspended gas systems which utilize much slower gas speeds.

At the uppermost cyclone means IV of the suspension gas-heat-exchange means 11, the ore particles are separated from the gas and are collected within the lower end of the cyclone means and charged through the discharge conduit 22 into gas conduit 16, disposed therebelow. Within this conduit the fine-grained ore particles, because of the initial high relative speeds between the ore particles and the reduction gas, are again greatly accelerated and finely dispersed or suspended in the gas stream so that the individual ore particles again come into optimal contact with the reduction gas molecules, as described above.

With decreasing relative speed, the finely dispersed particles next pass into cyclone means III, which is arranged below the uppermost cyclone means IV, and are there separated into solids and gaseous materials. The solids, which include the fine-grained ore particles, are collected at the bottom of this cyclone means and then guided through discharge conduit 23 into gas conduit 15. This process is then repeated throughout the remaining cyclones of the suspension gas-heat-exchange means 11. In this manner, as the particles pass from cyclone to cyclone, a relatively high and chronologically changing relative speed of the reduction gas vis-a-vis the speed of the ore particles occurs so that an optimal thermodynamic reduction occurs between the gas molecules and the crystal surface of the actual oxide particles. Further, this system provides an especially favorable ratio of gas to solids and provides a continuous disruption of the reduction equilibrium. Further, since the distances separating the various cyclones are relatively short, the entire system functions on a countercurrent princple, and, for the individual steps or stages, provides a continuously varying relative speed component between the gas and the ore particles.

Once the reduced ore particles reach the lowermost cyclone means I, they are charged, if necessary with further slag-forming material, into the branch conduit 10 and from there are blown into the smelting cyclone 13. Substantially simultaneously, a controlled amount of oxygen is introduced into the smelting cyclone so that only a sufficient amount of oxygen is present to react in a stoichiometrically deficient manner with the reduction gas in this cyclone. In this manner, conditions are proper for a melting-down of the pre-reduced iron ore particles within cyclone means 13 under reduction conditions. The so-melted iron is then collected in the collecting furnace means 14, such as an electro-furnace, along with only enough exhaust gas from the cyclone furnace 13 so that reduction conditions prevail within the furnace 14. Liquid iron is then removed from the collector furnace 14 as the valuable product and further processed as desired.

Since the reduction gas produced within the molten metal bath reactor means is at a temperature of about 1400° C., it is necessary to cool the amount of such gas introduced into the suspension gas-heat-exchange means to temperatures suitable for dry reduction, i.e., about 900° C. In order to accomplish this with the system of the invention, the spent reduction gas from the suspension gas-heat-exchange means (after purification through the dust-removing device) is recycled via conduit 26 into conduit 9, which guides freshly generated reduction gas into the hottest cyclone I of the system. With a return gas quantity of about 10 to 20% fed into conduit 9, one obtains, prior to at least cyclone I, an average gas temperature of about 1100° to 1300° C. so that through heat-exchange between the ore particles being processed and such cooled, but still hot reduction gas, an average temperature within the suspension gas-heat-exchange means 11 of about 900° C. is attained and this temperature is substantially maintained throughout the suspension gas-heat-exchange means so that surface softening or melt-phase formation, along with the subsequent danger of agglomeration of the individual particles is continuously prevented within the system. Further, the $CO_2$-containing return gas, via its oxidation capacity, also converts the carbon deposited in the cooler regions of the suspension gas-heat-exchange means and on cooler ore particles into CO so that no dilution of the reduction gas occurs and such carbon is removed from the system.

The reduction gas removed from the suspension gas-heat-exchange means via the pump means 20, after purification via the dust-removing device 19, is burned, along with a controlled additional amount of oxygen, in combustion chamber 27. The resulting hot gases are then guided into the hot-air generator 29 for cooling such gases and generating an amount of heat. The cooled exhaust gases are then conveyed to ambient atmosphere while the heat removed by the hot-air generator is conveyed, as in a suitable air stream introduced into such generator via conduit 29c, through the pre-heating device 30 to selectively pre-heat fresh ore particles before such particles are brought into contact with the reduction gas.

The invention is not limited to the exemplary embodiment described and various modifications and changes may be made without departing from the principles of the invention. For example, the entire amount of reducing gas generated within the molten metal bath reactor means may be directly conveyed into the smelting cyclone means and withdrawn therefrom and then conveyed through the suspension gas-heat-exchange means as described above. Thus, even in such alternative embodiments, optimal conditions for reduction between the gas and the ore particles within such suspension gas-heat-exchange means are attained.

Other embodiments of the invention utilizing the same or equivalent principles may also be used and structural changes may be made as desired by those skilled in the art without departing from the invention or the purview of the appended claims.

We claim as our invention:

1. An apparatus for direct recovery of metal from relatively fine-grained metal-bearing ores, comprising:
    (1) a molten metal bath reactor having a molten metal bath therein, at least one nozzle means located below an upper surface of said metal bath, said nozzle means being connected to a supply of carbon-containing materials and oxygen-containing materials, and a gas collection chamber located within said reactor above the upper surface of said metal bath whereby a $CO/H_2$-rich reduction gas is generated by said bath from said materials and collected in said chamber;
    (2) a multi-stage reduction means comprised of a plurality of cyclone means arranged in a superimposed relation with one another and in operative communication at a lower end thereof with said reactor means and at an upper end thereof with a source of relatively fine-grained metal-bearing ore particles, so that said reduction gas is conveyed upwardly through said plurality of cyclone means while substantially simultaneously said ore particles are conveyed downwardly through said plurality of cyclone means so that said particles are sequentially reduced within said cyclone means to such an extent that after a last of said cyclone means, said particles form reduced ore particles; and
    (3) a smelting reactor means in communication with said multi-stage reduction means for receiving said reduced ore particles from said multi-stage reduction means and converting said particles to liquid metal.

2. An apparatus as defined in claim 1 wherein said multi-stage reduction means is a suspension gas-heat-exchange means.

3. An apparatus as defined in claim 1 wherein said conduit means interconnects said reactor means with a smelting reactor means.

4. An apparatus as defined in claim 3 wherein said smelting reactor means includes a conduit for oxygen-containing materials.

5. An apparatus as defined in claim 1 wherein said multi-stage reduction means includes an exhaust conduit and a return conduit, which interconnects said exhaust conduit with said reduction means at a location spaced from said exhaust conduit.

6. An apparatus as defined in claim 5 wherein said return conduit is interconnected with said reduction means at a location leading to a hottest cyclone means of said plurality of cyclone means.

7. An apparatus as defined in claim 1 wherein said multi-stage reduction means includes an exhaust conduit, along with a combustion chamber which is interconnected with said exhaust conduit to burn gases conveyed by said exhaust conduit, a hot-air generator which is interconnected with a hot-gas outlet of said combustion chamber and has a hot-air conduit connected with a pre-heating device which receives ore particles before such particles are passed into said multi-stage reduction means.

8. An apparatus as defined in claim 1 wherein said smelting reactor means comprises a cyclone furnace means and a collection furnace means.

9. An apparatus as defined in claim 8 wherein said collection furnace means includes a withdrawal conduit extending between said metal bath reactor means and said collection furnace at a location in said reactor means corresponding to said upper surface of the molten bath therein.

* * * * *